# 3,306,718
ABRASIVE PRODUCT

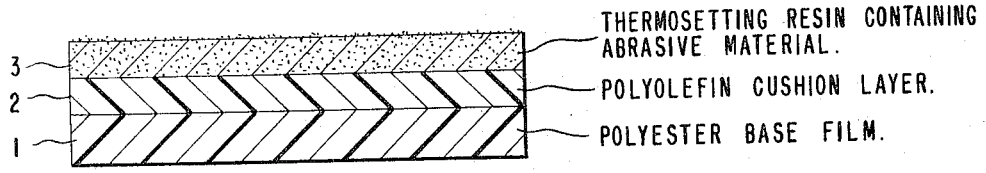

Aurelius Franklin Chapin, Wilmington, Del., assignor to E. I. du Pont de Nemours and Company, Wilmington, Del., a corporation of Delaware
Filed Mar. 16, 1964, Ser. No. 352,057
6 Claims. (Cl. 51—297)

This invention relates to improved abrasive products and more particularly to improved polyester based abrasive products having an intermediate polyolefin cushion layer.

Polyester films, in particular biaxially oriented polyester films, have excellent strength in the transverse and longitudinal directions, but poor strength in the non-oriented thickness direction. For this reason, a nonelastic, brittle coating causes tears in the polyester film surface. This defect is particularly objectionable for the britte coatings (phenol-formaldehyde, epoxy, urea-formaldehyde resins and animal glue) used to bond grit to polyester films for use as abrasive belts, sheets or discs. The defect can be partially overcome by use of suitable adhesive coatings; however, adhesive coatings are difficult to apply uniformly to polyester film. In addition, solvent and adhesive removal cost are serious drawbacks. Furthermore, in the manufacture of the abrasive products, a release sheet is needed due to the blocking of the adhesive coating. Since a smooth layer is difficult to form, shallow areas, which can collect resin, are formed and become a source of weakness of the final abrasive product.

It is, therefore, an object of this invention to provide an improved polyester based abrasive product.

It is a further object of this invention to provide an improved polyester based abrasive product having an intermediate polyolefin cushion layer which (1) eliminates the need for a release sheet, (2) prevents tearing of the base polyester film, (3) can be applied as a smooth layer thereby eliminating shallow areas which can collect resin and become a source of weakness and (4) eliminates the need for solvent removal. These and other objects will appear hereinafter.

These and other objects of this invention are accomplished by providing an abrasive product which comprises a base layer of a polymeric linear terephthalic acid ester film, preferably biaxially oriented polyethylene terephthalate film, having one surface treated to effect adherability; a coating on the treated surface of a polyolefin cushion layer, preferably polyethylene or polypropylene, having a thickness of one to three mils and having the outer surface of the polyolefin treated to effect adherability; and a thin layer of a thermosetting resin, preferably a phenol-formaldehyde resin, coated on the treated polyolefin surface, the resin containing an abrasive material, preferably aluminum oxide or silicon carbide. The brief description of the abrasive product just described is schematically shown in the accompanying drawing. In the drawing, a base layer of a polyester film (1) has coated thereon layer (2) which is a polyolefin cushion layer. Coated on layer (2) is a layer (3) composed of a thermosetting resin containing an abrasive material. The advantages of the abrasive product are particularly apparent when used as an abrasive belt.

The base layer is a polymeric linear terephthalic acid ester film, preferably polyethylene terephthalate film, which has been biaxially oriented in the longitudinal and transverse direction, prepared as described in Whinfield and Dixon, U.S. Patent 2,465,319 and Scarlett, U.S. Patent 2,823,421. While a film made from polyethylene terephthalate, a polymer formed by the condensation reaction between ethylene glycol and terephthalic acid is preferred, other polyesters include: a polymer prepared by the condensation of at least one glycol selected from the group consisting of polymethylene glycols having 2–10 carbon atoms and 1,4-cyclohexanedimethanol and terephthalic acid or by carrying an ester interchange reaction between a glycol having 2-10 carbon atoms and a dialkyl ester of terephthalic acid wherein the alkyl group has from 1–4 carbon atoms, e.g., dimethyl terephthalate. The polyester base layer has a thickness of from 0.5 to 15 mils and is preferably about 1 to 5 mils in thickness.

The intermediate polyolefin layer is characterized as being a cushion for the polyester film base. It must be at least one mil in thickness and can be as thick as 3 mils or greater and can be applied by any of the commercial methods such as solvent casting, melt extrusion, or by laminating a preformed sheet of the polyolefin to the base polyester layer under heat and pressure. It is preferred that the polyolefin layer be polyethylene, polypropylene or polyisobutylene. It is also within the scope of the invention that copolymers of the alpha-olefins be employed as the cushion layer.

The maker of binder resin for imbedding the abrasive grains and uniting the same to the intermediate polyolefin layer is a heat-hardened thermosetting resin such as phenolformaldehyde, urea - formaldehyde, melamine-formaldehyde, furfural-formaldehyde, or resorcinol-formaldehyde resins as shown in the art. Other applicable resins are the epoxy resins and the polyurethanes.

A great variety of abrasive grit material can be employed and can include such materials as feldspar, aluminum oxide, garnet, silicon carbide, iron oxide ($Fe_3O_4$) and silica. The mesh size of the abrasive particles can be varied depending upon the coarseness of the end product desired and a range of mesh size can include the fine No. 500 mesh screen to the coarse No. 20 mesh screen size and even higher. The thickness of the maker resin layer can be varied from ½ mil, dried film basis (for fine grit) to 3 mils, dried film basis (for coarser grit). With a thin maker resin coating, the abrasive grit material may deposit only one particle thick; however, with greater amounts of resin, the number of abrasive particles will increase to several particles in thickness. A thickness of No. 400 grit abrasive may be 2 or 3 mils whereas for No. 100 grit, the abrasive layer may be 5–15 mils thick.

It is important to the present invention that a surface of the base polyester film be treated to effect adherability prior to the application of the polyolefin layer. It is also important that the outer surface of the polyolefin layer be treated to effect adherability. Any of the conventional methods for effecting adherability can be employed such as flame, electrical discharge or chemical treatment can be employed. For the polyester film, the surface can be primed with titanium acetyl acetonates, prepared by reacting from 1 to 4 mols of acetylacetone with 1 mol of an alkyl titanate, e.g., tetraisopropyltitanate.

The invention can be further understood by referring to the following examples:

EXAMPLE 1

A one mil layer of polyethylene is melt extruded onto a titanium acetyl acetonate primed surface of a one mil biaxially oriented polyethylene terephthalate film. The polyethylene surface is then Lepel treated to insure improved adherability. A water dispersed phenol-formaldehyde resin (American Sandpaper Company's maker resin) is applied to the treated polyethylene film surface to provide 1.2 grams per square foot dry, while wet No. 180 aluminum oxide grit is applied. The sample is then dried one hour at 65° C. The maker resin is diluted 1–1 with water and then applied to the above coating by means of a rubber roller to provide a coating of 0.8 gram per square foot dry. The sample is further dried 1 hour at 65° C. followed by 16 hours at 77° C. and finally for 32 hours at 88° C. The sample is next flexed to break the stiff, hard, cured phenol-formaldehyde resin coating into small pieces. No delamination occurred. After the flexed sample is used to sand cold rolled steel, excellent adhesion between the abrasive grit-maker coating and the base lamination is observed without any tearing in the base polyethylene terephthalate film surface.

EXAMPLE 2

An abrasive product is prepared as in Example 1 except that a 2 mil polyethylene cushion is employed. Here again, excellent sanding with little or no loss of adhesion between the abrasive coating and polyethylene cushion is observed without tearing the base polyethylene terephthalate film surface.

As a control, an abrasive product is prepared as in Example 1 using a polyethylene cushion only 0.5 mil in thickness. During the sanding operation, the abrasive belt deteriorated because the polyethylene cushion is not sufficient to prevent tearing of the base polyethylene terephthalate film surface.

EXAMPLE 3

An abrasive product is prepared as in Example 1 except a 1 mil layer of polypropylene is used as the cushion layer and No. 100 silicon carbide grit is used as the abrasive material. After sanding cold rolled steel, little or no loss of adhesion between the abrasive coating and polypropylene is observed. There is also no tearing of the base polyethylene terephthalate film.

What is claimed is:

1. An abrasive product comprising: a base layer of a polymeric linear terephthalic acid ester film; an intermediate coating on said surface of a polyolefin cushion layer having a thickness of one to three mils; and a thin layer of a thermosetting resin coated on said intermediate coating, said resin containing an abrasive material.

2. The abrasive product of claim 1 wherein the polymeric linear terephthalic acid ester film is biaxially oriented polyethylene terephthalate film.

3. The abrasive product of claim 2 wherein the polyolefin cushion layer is polyethylene.

4. An abrasive product comprising: a base layer of a biaxially oriented polyethylene terephthlate film; an intermediate coating on said surface of a polyethylene cushion layer having a thickness of one to three mils; and a thin layer of a phenol-formaldehyde resin coated on said intermediate coating, said resin containing an abrasive material.

5. The abrasive product of claim 4 wherein the abrasive material is aluminum oxide.

6. The abrasive product of claim 4 wherein the abrasive material is silicon carbide.

References Cited by the Examiner

UNITED STATES PATENTS

| | | | |
|---|---|---|---|
| 2,347,662 | 5/1944 | Carlton et al. | 51—298.1 |
| 3,043,673 | 7/1962 | Klein et al. | 51—298 |
| 3,043,716 | 7/1962 | Busse et al. | |
| 3,044,891 | 7/1962 | Lauchenauer et al. | 51—298 |
| 3,136,614 | 6/1964 | Kuzmick | 51—298 |
| 3,246,969 | 4/1966 | Embree et al. | 51—295 |

ALEXANDER H. BRODMERKEL, *Primary Examiner.*

ROBERT F. WHITE, *Examiner.*

D. J. ARNOLD, *Assistant Examiner.*